United States Patent
Surendran et al.

(10) Patent No.: US 12,197,840 B2
(45) Date of Patent: Jan. 14, 2025

(54) TECHNIQUES FOR MODELING AND VERIFICATION OF CONVERGENCE FOR HIERARCHICAL DOMAIN CROSSINGS

(71) Applicant: TEXAS INSTRUMENTS INCORPORATED, Dallas, TX (US)

(72) Inventors: Sudhakar Surendran, Bengaluru (IN); Venkatraman Ramakrishnan, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 484 days.

(21) Appl. No.: 17/562,728

(22) Filed: Dec. 27, 2021

(65) Prior Publication Data

US 2023/0205969 A1    Jun. 29, 2023

(51) Int. Cl.
*G06F 30/398* (2020.01)
*G06F 30/3312* (2020.01)

(52) U.S. Cl.
CPC ........ *G06F 30/398* (2020.01); *G06F 30/3312* (2020.01)

(58) Field of Classification Search
CPC ............................ G06F 30/398; G06F 30/3312
USPC ......................................................... 716/52
See application file for complete search history.

(56) References Cited

U.S. PATENT DOCUMENTS

| | | | |
|---|---|---|---|
| 11,467,851 B1 * | 10/2022 | De | G06F 30/20 |
| 2003/0110344 A1 * | 6/2003 | Szczepanek | H04L 12/4625 |
| | | | 709/200 |
| 2005/0044344 A1 * | 2/2005 | Stevens | G06F 15/7867 |
| | | | 712/227 |
| 2023/0110701 A1 * | 4/2023 | Surendran | G06F 30/396 |
| | | | 716/100 |

FOREIGN PATENT DOCUMENTS

WO    WO-2007078915 A2 *    7/2007    ......... G06F 17/5045

* cited by examiner

*Primary Examiner* — Suresh Memula
(74) *Attorney, Agent, or Firm* — Xianghui Huang; Frank D. Cimino

(57) ABSTRACT

A technique for convergence verification including receiving a data object representation of a first circuit block, receiving one or more assumptions associated with the first circuit block, identifying a synchronization scheme coupled to a port of the first circuit block, determining that the synchronization scheme is within a threshold flip-flop depth, identifying, based on the determination that the synchronization scheme is within the threshold flip-flop depth, a type of the synchronization scheme and a flip-flop depth between the synchronization scheme and the port, generating first convergence information for the first circuit block based on the identified type and flip-flop depth of the synchronization scheme, and outputting the generated convergence information.

20 Claims, 4 Drawing Sheets

TECHNIQUES FOR MODELING AND VERIFICATION OF CONVERGENCE FOR HIERARCHICAL DOMAIN CROSSINGS

BACKGROUND

Modern integrated circuits (ICs), both analog and digital, are very complex with anywhere from tens of thousands of components to billions of components on a single IC. This complexity has led to automated design tools being used to design ICs over an IC design cycle. As a part of this IC design cycle, a register transfer level (RTL) description of the IC may be generated. This RTL is a high level, logical representation of an IC and the RTL describes what the IC design is doing, that is, how data is transformed as the data passes through the IC. The RTL description is often represented as RTL code, similar to a low-level software programming language. The RTL description can then be converted to a physical design by mapping the RTL code to geometric representations of electrical components, such as resisters, flip-flops, logic gates, etc. and how these electrical components are connected. This mapping may be performed using synthesis tools and this representation of electrical components and how the electrical components are connected may be in the form of a netlist. A netlist, or hardware description language (HDL), generally is a list of the electrical components of a circuit and a list of nodes each electronic component is connected with. In certain cases, attributes, structural information, physical parameters, or other information may also be included in the netlist.

SUMMARY

Aspects of this disclosure relate to a technique for convergence verification. The technique includes receiving a data object representation of a first circuit block. The technique also includes receiving one or more assumptions associated with the first circuit block. The technique further includes identifying a synchronization scheme coupled to a port of the first circuit block. The technique also includes determining that the synchronization scheme is within a threshold flip-flop depth. The technique further includes identifying, based on the determination that the synchronization scheme is within the threshold flip-flop depth, a type of the synchronization scheme and a flip-flop depth between the synchronization scheme and the port. The technique also includes generating first convergence information for the first circuit block based on the identified type and flip-flop depth of the synchronization scheme and outputting the generated convergence information.

Another as aspect of the present disclosure relates to a non-transitory program storage device comprising instructions stored thereon to cause one or more processors to receive a data object representation of a first circuit block. The instructions further cause the one or more processors to receive one or more assumptions associated with the first circuit block. The instructions also cause the one or more processors to identify a synchronization scheme coupled to a port of the first circuit block. The instructions further cause the one or more processors to determine that the synchronization scheme is within a threshold flip-flop depth. The instructions also cause the one or more processors to identify, based on the determination that the synchronization scheme is within the threshold flip-flop depth, a type of the synchronization scheme and a flip-flop depth between the synchronization scheme and the port. The instructions further cause the one or more processors to generate first convergence information for the first circuit block based on the identified type and flip-flop depth of the synchronization scheme and output the generated convergence information.

Another as aspect of the present disclosure relates to a device comprising one or more processors and a non-transitory program storage device comprising instructions stored thereon to cause the one or more processors to receive a data object representation of a first circuit block. The instructions further cause the one or more processors to receive one or more assumptions associated with the first circuit block. The instructions also cause the one or more processors to identify a synchronization scheme coupled to a port of the first circuit block. The instructions further cause the one or more processors to determine that the synchronization scheme is within a threshold flip-flop depth. The instructions also cause the one or more processors to identify, based on the determination that the synchronization scheme is within the threshold flip-flop depth, a type of the synchronization scheme and a flip-flop depth between the synchronization scheme and the port. The instructions further cause the one or more processors to generate first convergence information for the first circuit block based on the identified type and flip-flop depth of the synchronization scheme and output the generated convergence information.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

Figure 1A:
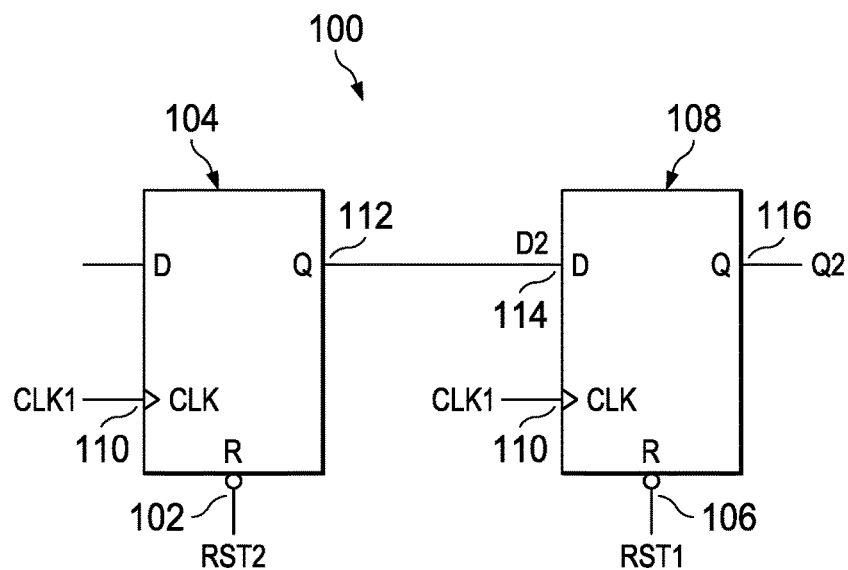
FIGS. 1A and 1B illustrate examples of domain crossings, in accordance with aspects of the present disclosure.

Often, a substantial amount of the design of an IC is performed at an RTL level to describe the logic and functionality of the IC. The RTL code may be a high-level logical representation of the logic of an IC being designed and the RTL code may comprise one or more a data object, such as a data file. The RTL level allows a design of the IC to be described at a relatively high level of abstraction using structures that are similar to those found in software programming languages, such as if statements, variables, mathematical operations, etc. As an example, the following RTL code example 1 illustrates a logical description of a source flip-flop 104 as shown in example circuit 100 of FIG. 1A. In RTL code example 1, the operation of the source flip-flop 104 is logically described as an if-else statement shown in lines 6-10.

```
1.    module source_flop (D, CLK, R, Q);
2.    input D, CLK, R;
3.    output Q;
4.    reg Q;
5.    always @ (posedge CLK or negedge R) begin
6.       if (!R) begin
7.          Q <= 0;
8.       end else begin
9.          Q <= D;
10.      end
11.   end
12.   endmodule
```

RTL Code Example 1

The RTL code may also describe connections such as connections between electronic components. As shown below, RTL code example 2 is an example of connection information describing the connections between source flip-flop 104 and a destination flip-flop 108.

1. module peripheral(/* port list */);
2. wire CLK1, RST1, RST2, D1, D2, Q2;
3. flop source flop (.D (D1), .CLK(CLK1), .R(RST2), .Q(D2));
4. flop destination flop (.D (D2), .CLK(CLK1), .R(RST1), .Q(Q2));
5. endmodule RTL Code Example 2

Synthesis tools can take the RTL and then synthesize a structural representation of the IC, for example, as a netlist. With RTL, it is possible to describe a logic of an IC without specifying specific electronic components or details about the electronic components. However, the RTL could include issues that can give rise to subtle problems when synthesized into hardware. For example, the above example RTL code corresponds to portions of FIG. 1A and includes a reset 1 106 (RST1) and reset 2 102 (RST2). As shown, the reset 2 102 of the source flip-flop 104 is different from the reset 1 106 of destination flip-flop 108. As the source flip-flop 104 and the destination flip-flop 108 have the same clocks 110, the source flip-flop 104 and destination flip-flop 108 are synchronized, but the resets are asynchronous as the resets can occur at any time. It is possible that a reset may be set on the reset 2 102 of the source flip-flop 104, which can cause the output of the source flip-flop 104 to change on the output Q 112. Where the reset 1 106 of the destination flip-flop 108 is not be set, the changed value D2 on output Q 112 is set on input D 114 of destination flip-flop 108, causing the value Q2 of Q 116 to change. Depending on the time the value of Q 116 is read, the value on Q may be nondeterministic. This mismatch between the resets of a synchronous design may be referred to as a reset domain crossing (RDC).

Figure 1B:
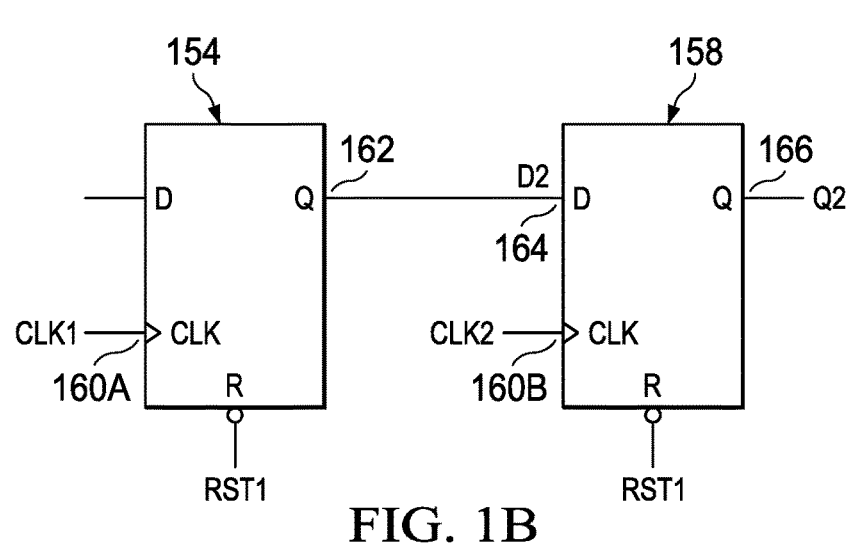

Similarly, a clock domain crossing (CDC) may be present where a set of electrical components which are supposed to be synchronized, but have different clocks. For example, as shown in FIG. 1B, source flip-flop 154 is clocked using clock 1 160A and destination flip-flop 158 is clocked using clock 2 160B. If clock 1 160A and clock 2 160B are not, or become, phase aligned, a change on the output Q 162 may not be set at a time when input D 164 is to be read, resulting in the value Q2 of output Q 166 to change at an unexpected time.

Notably, the above described examples of RDC and CDC are intended to be illustrative and many other RDC and/or CDC paths are possible. In some cases, tools to check for various RDC and CDC paths are available. As an example, these domain crossing analysis tools may accept an RTL code and analyze the RTL code for possible RDC and/or CDC (e.g. domain crossing) issues. In some cases, the domain crossing analysis tools may generate a set of domain crossing issues. In some cases, the domain crossing analysis may be performed on portions of an overall IC. For example, an overall IC may include many circuit blocks which can significantly increase complexity. Generally, a circuit block may provide connectivity, services, and/or interfaces for a processor. Examples of circuit blocks include, but are not limited to, universal serial bus (USB), multimedia card (MMC), display connectivity, timers, analog to digital converters, graphics processing unit or other image processing hardware, sensors, PCI express (PCIe) interface, etc. In some cases, a processor and a number of circuit blocks may be integrated together on a single chip, for example, on a SoC.

Once the set of domain crossing issues are generated, circuit designers may review the set of domain crossing issues to check what may be causing the domain crossing issues to be raised by the domain crossing analysis tool. The domain crossing issues raised may be checked and resolved manually by circuit designers. For example, list of domain crossing issues may be generated and circuit designers may go down the list and address the domain crossing issues raised by making changes to the circuit, ensuring that any corner case caused by the domain crossing does not result in a system error, or otherwise addressing the issue. In some cases, a domain crossing issue raised may be addressed based on an assumption. These assumptions may be based on, for example, expected structural and/or operational configurations of the circuit under which the domain crossing issue raised does not apply. For example, where a domain crossing analysis has indicated a circuit may have a CDC crossing issue where a first component coupled to a first clock outputting to a second component coupled to a second clock, the circuit designer may know/believe that, in operation, the second component is clock gated or kept in reset when the output from the first component is presented and therefore, the CDC crossing issue is assumed to not apply as the second component is not going to be affected by the output of the first component.

Where the domain crossing analysis is performed on the RTL code, there may not be a mechanism to verify the assumptions. For example, verifying that the second component is clock gated or kept in reset may be performed, for example, by simulating portions of the IC. However, this simulation is performed using the netlist description of the structure of the IC that is synthesized from the RTL code. As the domain crossing analysis may be performed prior to the synthesis of the RTL code, there may not be a netlist to verify the assumptions on. Additionally, current domain crossing analysis tools are not linked to implementation verification tools, such as for netlist level verification or functional level analysis and timing verification, and there is no mechanism for defining specific verification techniques based on the assumptions.

Figure 2:
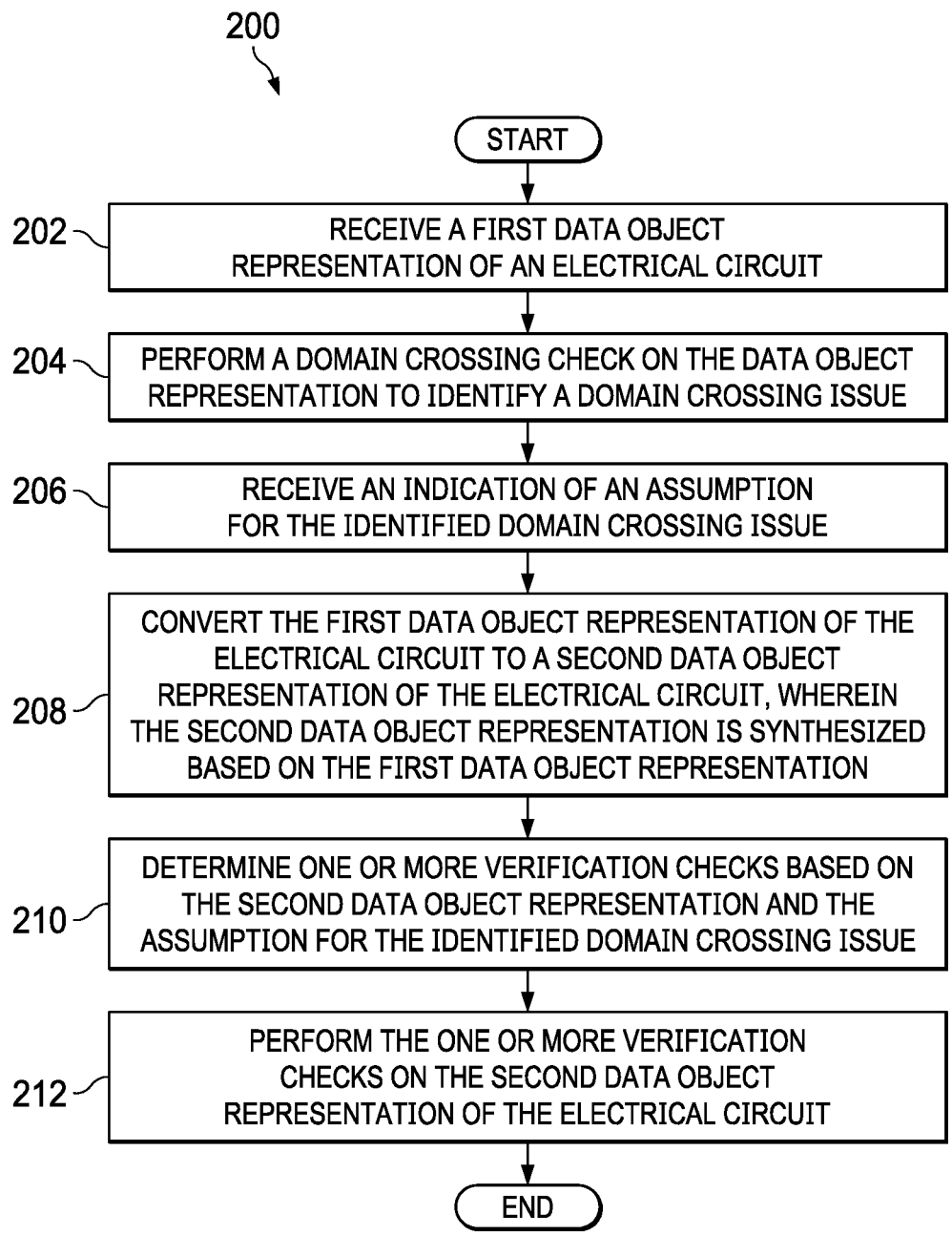
FIG. 2 is a flow diagram illustrating a technique for design verification of domain crossings, in accordance with aspects of the present disclosure.

FIG. 2 is a flow diagram illustrating an overview of a technique for circuit verification, in accordance with aspects of the present disclosure. At block 202, a first data object representation of an electrical circuit is received. For example, a data object, such as a file may be received. The file may be a representation of an electrical circuit, such as an IC being designed. In some cases, the representation may be a logical representation of the electrical circuit, such as an RTL. In other cases, the representation may include hardware representations, such as with a netlist or HDL. In some cases, the representation may be for a portion of a larger electrical circuit. For example, the representation may be for a circuit block of an IC and/or SoC.

At block 204, a domain crossing check is performed on the data object representation to identify a domain crossing issue. For example, a set of clock domain crossing checks and/or reset domain crossing checks may be performed on the representation. The domain crossing checks may be performed on the representation of the electrical circuit. For example, the domain crossing checks may be performed based on the RTL file representing the electrical circuit. The different domain crossing checks may take various paths through the representation. For example, with a logical representation, such as an RTL, different paths through the representation may be performed using different data values. The domain crossing checks may identify one or more domain crossing issues. In some cases, the domain crossing issues returned may be associated with a particular path through the representation used by the domain crossing checking tool to identify the domain crossing issue. In some cases, the domain crossing issues along with path information, if available, may be output. This output may be output, for example, as a part of the representation of the electrical circuit, such as in the file. The output may also be output as a separate file, as metadata, or any other electronic representation. For example, a domain crossing checking tool may be run on an RTL file and the domain crossing checking tool may either generate a separate domain crossing issues file, or modify the RTL file to include the identified domain crossing issues. In some cases, the domain crossing issues may be presented, for example, to a user such as a chip designer via a user interface.

At block 206, an indication of an assumption for the identified domain crossing issue is received. For a particular domain crossing issue, the user may identify one or more assumptions made to dismiss the domain crossing issue and these assumptions may be recorded. For example, identified domain crossing issues may be presented to a user along with a list of possible assumptions. In some cases, the identified domain crossing issues may be presented by a user interface of the domain crossing checking tool. In some cases, assumptions may be tracked via a separate tool from the domain crossing checking tool. The domain crossing checking tool may also include a set of possible assumptions, where the different assumptions of the set of possible assumptions may be associated with domain crossing issues. In some cases, a list of assumptions may be determined based on a specific identified domain crossing issue. The determined list of assumptions associated with the identified domain crossing issue may be presented to the user, for example, along with the identified domain crossing issue. The user may then select one or more assumptions from the list of assumptions. Returning to a previous example for specifics, a circuit may have a CDC crossing issue where a first component coupled to a first clock outputting to a second component coupled to a second clock, the domain crossing checking tool may include an interface that presents a list of assumptions applicable to the CDC crossing issue, such as that the second component is clock gated, the second component is kept in reset, that the datapath to a destination of the second component is blocked when the output from the first component is presented, etc. The user may then select (e.g., provide) an assumption, such as that the second component is clock gated, from the list of assumptions. The provided assumptions may be stored as assumption information.

In some cases, the provided assumption may be associated, for example, with a path through the circuit block or other portions of the circuit, being analyzed. For example, the domain crossing checking tool may take various paths through the representation of the electrical circuit and these paths may involve different electrical components. This path, data input resulting in this path, and/or electrical components involved in the path may be recorded. For example, the representation of the portions (e.g., the RTL code) may be edited to include the logical path (or data input) resulting in this path, along with a representation of the received assumption. The path information (e.g., path, data input resulting in the path, and/or components involved in the path) for an assumption inherently associates the assumption with a portion of the representation of the electrical circuit. The path information may be included along with the assumption in the assumption information.

In some cases, the assumption information may be checked for internal consistency. Assumptions provided for different portions of the electrical circuit may occasionally be conflicting and checking for such conflicts can help reduce circuit development times. Returning to the example from above with a first component coupled to a first clock outputting to a second component coupled to a second clock having a CDC crossing issue. An assumption may be provided that the second component is clock gated when the first component outputs to the second component. Extending this example, the second component may be coupled to a third component in such a way as another CDC crossing issue is identified. The user may provide an assumption indicating that the second component is kept in reset. However, the second component may not be both clock gated and kept in reset. In some cases, path information may be used to perform internal consistency checking.

The processes of blocks 202 through 206 may be performed for multiple iterations. Assumptions from a previous iteration may be fed back to later iterations, and paths that cross a domain and have an applied assumption from a previous iteration may be omitted from subsequent reports or may be reported along with an indication of the applied assumption. In this manner, the iterations may repeat until the design meets some threshold of quality.

At block 208, the first data object representation of the electrical circuit is converted to a second data object representation of the electrical circuit, wherein the second data object representation is synthesized based on the first data object representation. For example, a synthesis tool may convert an RTL description of an electrical circuit into a netlist description of the electrical circuit. As another example, the netlist description of the electrical circuit may be used by another synthesis tool, (e.g., routing and placement tools) to synthesize connections and a physical layout of the electrical circuit. In some cases, as a part of the conversion, the assumption information may be processed. The assumption information may be passed to the synthesis tool, for example, as a separate data object, such as a file, or along with the first data object representation, such as embedded in the file, as metadata to the file, etc. In some cases, this assumption information may be converted by the synthesis tool to a format compatible with the format of the synthesized second data object representation. In some cases, the assumption information may include path information indicating the portions of the first data object representation associated with a given assumption. As the synthesis tools may convert or otherwise transform the portions of the first data object representation into another representation of the electrical circuit, the synthesis tool may also identify a second portion of the second data object representation that correlates with the indicated portions of the first data object representation. For example, the synthesis tool may convert an indicated portion of the first data object representation (e.g., a logical data path) into a second portion of the second data object representation (e.g., a collection of physical device representations) and associate the assumption with this second portion.

At block 210 one or more verification checks may be determined based on the second data object representation and the assumption for the identified domain crossing issue. For example, assumptions may be associated with a set of verification checks. Not all verification checks may apply to all possible design configurations or representations of the electrical circuit. Specific verification checks may be determined as appropriate for the particular assumption, the second data object representation, and/or the structure associated with the assumption (if available).

At block 212, one or more verification checks may be performed on the second data object representation of the electrical circuit. The determined verification checks may be executed to verify the correctness of the assumption. In some cases, the verification checks may be performed, for example, by a verification tool. The verification tool may, for example, use the second data object representation as input. Returning to the example above, where a circuit may have a CDC crossing issue where a first component coupled to a first clock outputting to a second component coupled to a second clock and there is a provided assumption that that the second component is clock gated when the first component output to the second component, this assumption may be verified, for example, by simulating the electrical circuit based on the netlist description and verifying that the second component is indeed clock gated. In some cases, the verification may be based on the path information. For example, the path or data input associated with the assumption may be used to inform the verification process by simulating the data input associated with the assumption being input to the electrical circuit. In cases where the determined verification checks do not succeed (e.g., the assumption is unverified) for a particular assumption, the particular assumption may be output, for example, for presentation to the user. In some cases, path information associated with the unverified assumption may also be presented.

In some cases, a verification check for an assumption may involve a formal method, such as a mathematical proof. In such cases, the verification checks may be performed, for example, by a user. For example, the verification tool may indicate to the user that a particular formal method should be used to verify one or more assumptions.

In some cases, cross domain checking may be performed on a portion of the electrical circuit and multiple portions of the electrical circuit may be joined together. For example, cross domain checking may be performed at a circuit block level and then multiple circuit blocks joined together. As assumptions were verified across a circuit block, the assumptions across multiple circuit blocks may also be verified. The verification of assumptions across multiple circuit blocks may be performed as a part of a convergence analysis. Convergence generally refers to multiple signals which are prone to metastability, such as unsynchronized signals in different timing domains, coming together in a single electronic device, such as a flip-flop. The convergence of signals that are prone to metastability may cause the output signal of the electronic device to be unknown in certain states. As a complex IC, such as a SoC can have a large number of circuit blocks, and hence electronic devices, instead of attempting to perform a complex CDC/RDC analysis across multiple circuit blocks, the assumption information produced during a circuit block level analysis and verification checks may be leveraged along with functional parameters of the circuit block to help with convergence analysis.

Figure 3:
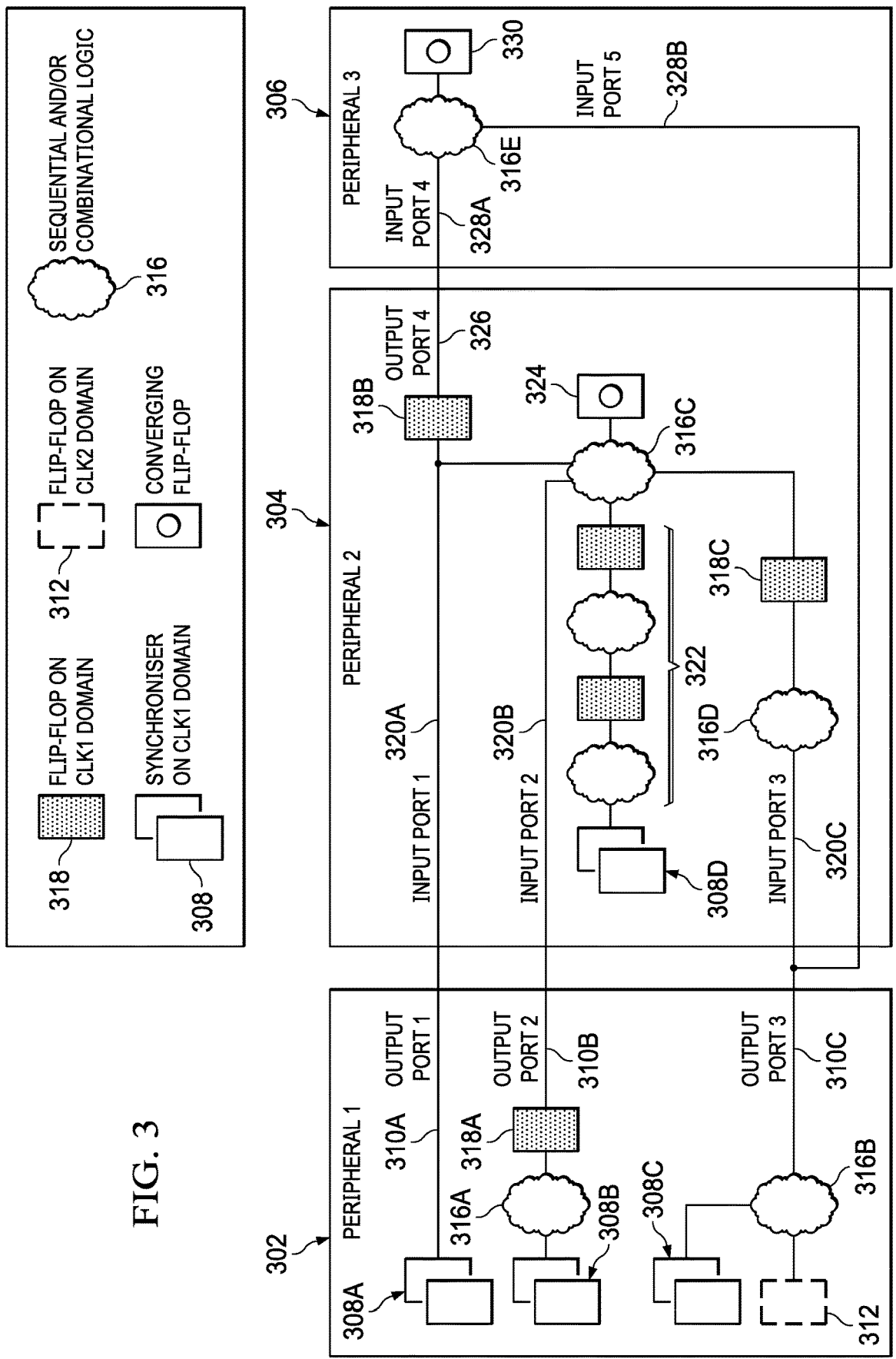
FIG. 3 is a block diagram illustrating a set of coupled circuit blocks, in accordance with aspects of the present disclosure.

FIG. 3 is a block diagram 300 illustrating a set of coupled circuit blocks, in accordance with aspects of the present disclosure. Diagram 300 includes three circuit blocks, circuit block 1 302, circuit block 2 304, and circuit block 3 306. In this example, the domain crossing checks and verification checks were performed at a circuit block level, thus addressing the domain crossing issues at the circuit block level. In some cases, potential domain crossing issues may be addressed using synchronizer circuits. A synchronizer circuit is a circuit which help determine a state as between asynchronous and/or metastable signals and synchronizer circuits may be used, for example, to address potential CDC issues.

Circuit block 1 302 includes three synchronizer 308A, 308B, and 308C respectively coupled to output port 1 310A, output port 2 310B, and output port 3 310C of circuit block 1 302. The three synchronizers 308A, 308B, and 308C are running in a first clock domain (e.g., in the clock 1 domain). Circuit block 1 302 also includes a flip-flop 312 running in a second clock domain (e.g., in the clock 2 domain). Synchronizer 1 308A directly outputs on output port 1 310A. Synchronizer 2 308B outputs to output port 2 3106 via sequential and/or combinational logic 316A (generically 316) and a flip-flop running in the first clock domain 318A (generically 318). Synchronizer 3 308C outputs on output port 3 310C via a set of sequential and/or combinational logic 316B.

Output port 1 310A of circuit block 1 302 is coupled to input port 1 320A of circuit block 2 304. Likewise, output port 2 3106 and output port 3 310C of circuit block 1 302 are coupled to input port 2 320B and input port 320C of circuit block 2 304, respectively. The input port 1 320A of circuit block 2 304 is coupled to flip-flop 318B of circuit block 2 304. Input port 2 230B of circuit block 2 304 is coupled to logic 316C of circuit block 2 304. Circuit block 2 304 also includes synchronizer 308D running the clock 1 domain coupled. Synchronizer 308 is coupled to logic 316C via a chain 322 of flip-flops and logic. The input port 3 320C of circuit block 2 304 is also coupled to logic 316C via logic 316D and flip-flop 318C of circuit block 2 304. Logic 316C is coupled to flip-flop 318B and converging flip-flop 324. flip-flop 318B is outputs to output port 4 326 of circuit block 2 304. Generally, a converging flip-flop is a flip-flop in which metastable events propagate to the input of the flip-flop via more than one path. That is, the input of the flip-flop has multiple independent metastability sources.

Output port 4 326 of circuit block 2 304 is coupled to input port 4 328A of circuit block 3 306. Output port 3 310C of circuit block 1 302 is coupled to input port 5 328B of circuit block 3 306. Both input ports 4 328A and 5 328B are coupled to converging flip-flop 330 via logic 316E.

Convergence attributes and functional parameters may be used for convergence checking across circuit blocks. Convergence attributes and functional parameters, collectively cross-circuit block convergence information, may be determined on a per circuit block basis. In some cases, the cross-circuit block convergence information may be determined based on assumption information for the circuit block. The convergence attributes indicate a presence of a design feature of the circuit block which can affect convergence across multiple circuit blocks. The convergence attributes may indicate when a synchronizer circuit or synchronization scheme is present on an input or output port of a circuit block (e.g., a synchronizer directly inputting or outputting on the input/output port), such as synchronizer 308A, which directly outputs on output port 1 310A of circuit block 1 302. Thus, the convergence attributes would indicate the presence of synchronizer 308A on output port 1 310A of circuit block 1 302, which is coupled to input port 1 320A of circuit block 2 304. In some cases, the convergence attributes may also indicate a synchronizer type or scheme, clock domain information for each synchronizer, and logic depth (flip-flop stages) for each path from the source synchronizer to the destination flip-flop identified as a convergence point.

A synchronization scheme (e.g., functional scheme) may refer to a potential domain crossing issue which may be resolved based on an assumption that the signal may only propagate under certain understood conditions, such as a predictable signal through a logic path. In this example, synchronizer 308C running in the first clock domain is coupled to flip-flop 312 in the second clock domain via logic 316B, which raises a potential domain crossing issue. In some cases, a synchronizer is a type of a synchronization scheme. Provided assumption information may indicate that the logic 316B provides fora predictable signal transfer and the validation checks may confirm this. As the synchronization scheme in logic 316B outputs directly to output port 3 310C, the convergence attributes may indicate the presence of the synchronization scheme on output port 3 310C of circuit block 1 302 coupled to input port 3 320C of circuit block 2 304 and the presence of the synchronization scheme on output port 3 310C of circuit block 1 302 coupled to input port 5 328B of circuit block 3 306.

In some cases, the convergence attributes may also indicate when a synchronizer circuit or synchronization scheme is present within a certain threshold flip-flop depth of the input or output port of a circuit block. For example, where the threshold flip-flop depth is one level, then the convergence attributes would also include information about a synchronizer coupled to a flip-flop that is then coupled to an output port (or an input port coupled to a flip-flop that is then coupled to a synchronizer). In this example, assuming a threshold flip-flop depth of one, the convergence attributes may indicate the presence of synchronizer 308B at a flip-flop depth of one on output port 2 3106 of circuit block 1 302, which is coupled to input port 2 320B of circuit block 2 304. In some cases, checking for a synchronizer within the threshold flip-flop depth may span multiple circuit blocks. For example, the convergence attributes may also indicate the presence of synchronizer 308A at a flip-flop depth of one on the output port 4 326 of circuit block 2 304, which is coupled to input port 4 328A of circuit block 3 306. Notably, synchronizer 308D, while coupled to output port 4 326 with a flip-flop depth of three (two flip-flops of the chain 322 and flip-flop 318D). As the flip-flop depth of synchronizer 308D exceeds the threshold flip-flop depth of one, synchronizer 308D may not be included in the convergence attributes.

Functional parameters for convergence checking across circuit blocks may be obtained based on assumptions made for the input/output ports along with synchronization scheme information. For example, as discussed above, the synchronization scheme in logic 316B outputs directly to output port 3 310C and there is an assumption provided indicating that the logic 316B provides for a predictable signal transfer. Thus, information about the synchronization scheme logic 316B on output port 3 310 of circuit block 1 302 may be included in the functional parameters. Functional parameters may be based on the assumption information about the synchronization scheme, such as the type of synchronization scheme, flip-flop depth before/after the synchronization scheme to the input/output port of the circuit block, etc. Additionally, any signal property assumptions made for the input and output signals may be included in the functional parameters. For example, assumptions may be provided, at a circuit block level, for signals received as inputs to the circuit block. These assumptions may include what clock domain the signal is on, whether there is mutual exclusivity of the signal on the clock domain (e.g., only one of the signals changes state at any point in time), the presence of one hot signal constraints, etc. Generally, convergence attributes may be identified based on structural aspects, while functional parameters describe the functionality of the logic cones of circuit blocks being analyzed. The functional parameters may include information about synchronization scheme and assumptions, along with other functional information which may impact metastability, such as when a particular path is used, when a designed behavior may be used, etc. In this example, assumption information may be provided for the circuit block input ports, such as input port 1 320A, input port 2 320B, and input port 3 320C of circuit block 2 304 and input port 4 328A and input port 5 328B of circuit block 3 306. The assumptions for the input signals can be used to help flag inconsistencies and/or convergences that may be missed on a circuit block level analysis or an analysis based on just the synchronization schemes.

Convergence checks at a multi-circuit block level may be performed based on the generated convergence attributes and functional parameters. For example, as a part of cross domain checking and verification of assumptions at a circuit block level, convergence attributes and functional parameters may be recorded based on the assumption information. Multiple circuit blocks may then be analyzed together, for example, by a software program which takes the convergence attributes and functional parameters for the multiple circuit blocks and performs convergence checks based on the convergence attributes and functional parameters. These convergence checks may include, for example, structural consistency checks and functional consistency checks. Structural consistency checks are checks on parameters which may be checked independent of the functionality of the circuit block. Examples of structural consistency checks include checking a depth of the input signal from any synchronizer in the integration context, cross-checking the presence of a synchronizer when an input to a circuit block being called is externally synchronized, and a convergence assessment using the information captured in the convergence model of a circuit block.

The specific convergence checks to be applied may be based on the presence of a synchronizer/synchronization scheme coupled to the input port, the type of synchronizer/synchronization scheme, and the flip-flop depth of the synchronizer/synchronization scheme on the output port. The structural consistency checks may also verify the functional assumptions as between circuit blocks, such as whether and what type of a synchronizer/synchronization scheme is present on an output port a first circuit block and whether the assumed input signal is consistent on the input port of a second circuit block coupled to the output port of the first circuit block. Functional consistency checks may check for consistency of the signal properties as between the output signal properties and input signal properties. Inconsistencies raised by either the structural or functional consistency checks may be flagged for review, for example by a user such as a chip designer. As an example, functional constraint at the circuit block level analysis should be reverified in the integration context, for example, of an IC. Examples of functional consistency checks may include verifying mutual exclusivity constraints on boundary signals or signals influenced by the boundary constant value settings that can impact path selection (e.g. mux selects driven by block inputs that determine synchronized paths which in turn can impact convergence), synchronization schemes that are impacted by integration-influenced signals, etc.

Figure 4:
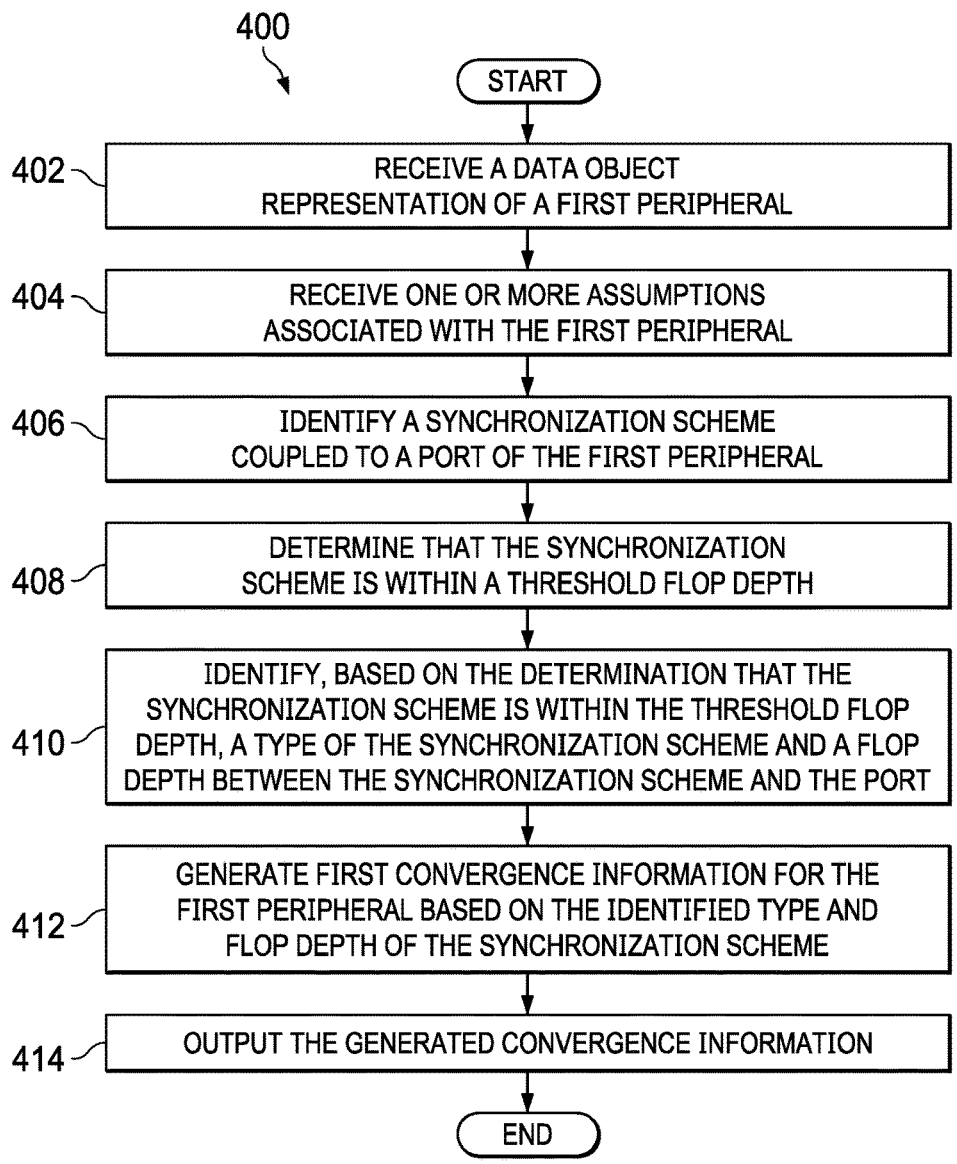
FIG. 4 is a flow diagram illustrating an overview of a technique for performing consistency checking across multiple circuit blocks, in accordance with aspects of the present disclosure.

FIG. 4 is a flow diagram 400 illustrating an overview of a technique for performing consistency checking across multiple circuit blocks, in accordance with aspects of the present disclosure. In some cases, steps of flow diagram 400 may be performed, for example, by a computing device. In some cases, one or more software programs executing on the computing device may perform the steps. The computing device may include a processor configured to execute one or more computing programs stored on a non-transitory memory storage device. At block 402 a data object representation of a first circuit block is received. For example, a data object, such as a file may be received. The file may be a representation of an electrical circuit, such as an IC being designed. In some cases, the representation may be a logical representation of the electrical circuit, such as an RTL. In other cases, the representation may include hardware representations, such as with a netlist or HDL. In some cases, the representation may be for a portion of a larger electrical circuit. For example, the representation may be for a circuit block of an IC and/or SoC.

At block 404, one or more assumptions associated with the first circuit block is received. For a particular domain crossing issue, the user may identify one or more assumptions made for potential domain crossing issue and these assumptions may be recorded. In some cases, these assumptions may include assumptions for inputs to be received on the input port and assumptions for outputs on the output ports. At block 406, a synchronization scheme coupled to a port of the first circuit block is identified. For example, potential domain crossing issues which may be resolved based on an assumption are identified. This identification may be based on the assumption information. In some cases, synchronization schemes may include synchronizers. The synchronization scheme may also include logic that provides for a predictable signal transfer.

At block 408, a determination that the synchronization scheme is within a threshold flip-flop depth is made. For example, a threshold flip-flop depth may be provided, for example, by a user or a preconfigured setting. A flip-flop depth between the synchronization scheme and a port of the circuit block is determined. The flip-flop depth looks at a number of flip-flops between the synchronization scheme and the port. The flip-flop depth is compared to the threshold flip-flop depth. If the flip-flop depth is within the threshold flip-flop depth, the presence of the synchronization scheme for the port may be recorded as a convergence attribute.

At block 410, based on the determination that the synchronization scheme is within the threshold flip-flop depth, a type of the synchronization scheme and a flip-flop depth between the synchronization scheme and the port is identified. For example, information about the synchronization scheme may be obtained when the synchronization scheme is within the threshold flip-flop depth. A type of synchronizer or type of logic of may be determined. This type of the synchronization scheme and flip-flop may be stored as functional parameters. At block 412, first convergence information for the first circuit block is generated based on the identified type and flip-flop depth of the synchronization scheme. In some cases, the convergence attributes and functional parameters may be stored, for example, as a data object. This data object may be separate from the data object representation of the first circuit block and this data object may represent a minimum amount of information for performing a convergence analysis across circuit blocks. At block 414, the generated convergence information is output.

In some cases, second convergence information for a second circuit block is received and consistency checks may be performed based on the first convergence information and the second convergence information. In some cases, a software program separate from another software program which generates the first convergence information may receive convergence information for the first circuit block and the second circuit block. In some cases, connection information indicating how the first circuit block and the second circuit block may also be received. The connection information may be received, for example, as a part of the second convergence information, or separate form the second convergence information. The consistency checks may include verifying the assumptions for outputs of the first circuit block are consistent with assumptions for inputs of the second circuit block. In some cases, the consistency checks include verifying that the identified type and flip-flop depth of the synchronization scheme is consistent with an assumption associated with the input port of the second circuit block. In addition to structural and functional consistency checking, the convergence information may be used to identify convergences that only become evident across circuit blocks, such as for converging flip-flops 3188 and 330.

Figure 5:
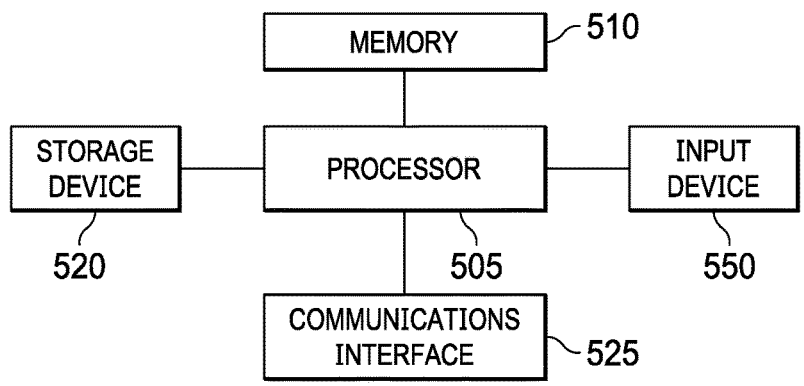
FIG. 5 is a is a block diagram of an embodiment of a computing device, in accordance with aspects of the present disclosure.

As illustrated in FIG. 5, device 500 includes a processing element such as processor 505 that contains one or more hardware processors, where each hardware processor may have a single or multiple processor cores. Examples of processors include, but are not limited to, a central processing unit (CPU), image processor, or a microprocessor. Although not illustrated in FIG. 5, the processing elements that make up processor 505 may also include one or more other types of hardware processing components, such as graphics processing units (GPUs), application specific integrated circuits (ASICs), field-programmable gate arrays (FPGAs), and/or digital signal processors (DSPs). In certain cases, processor 505 may be configured to perform the tasks described in conjunction with steps 202-212 of FIG. 2 and 402-414 of FIG. 4.

FIG. 5 illustrates that memory 510 may be operatively and communicatively coupled to processor 505. Memory 510 may be a non-transitory computer readable storage medium configured to store various types of data. For example, memory 510 may include one or more volatile devices such as random access memory (RAM), registers, etc. Non-volatile storage devices 520 can include one or more disk drives, optical drives, solid-state drives (SSDs), tap drives, flash memory, electrically erasable programmable read-only memory (EEPROM), and/or any other type memory designed to maintain data for a duration time after a power loss or shut down operation. The non-volatile storage devices 520 may also be used to store programs that are loaded into the RAM when such programs executed.

Persons of ordinary skill in the art are aware that software programs may be developed, encoded, and compiled in a variety of computing languages for a variety of software platforms and/or operating systems and subsequently loaded and executed by processor 505. In one embodiment, the compiling process of the software program may transform program code written in a programming language to another computer language such that the processor 505 is able to execute the programming code. For example, the compiling process of the software program may generate an executable program that provides encoded instructions (e.g., machine code instructions) for processor 505 to accomplish specific, non-generic, particular computing functions.

After the compiling process, the encoded instructions may then be loaded as computer executable instructions or process steps to processor 505 from storage device 520, from memory 510, and/or embedded within processor 505 (e.g., via a cache or on-board ROM). Processor 505 may be configured to execute the stored instructions or process steps in order to perform instructions or process steps to transform the computing device into a non-generic, particular, specially programmed machine or apparatus. Stored data, e.g., data stored by a storage device 520, may be accessed by processor 505 during the execution of computer executable instructions or process steps to instruct one or more components within the computing device 500. Storage device 520 may be partitioned or split into multiple sections that may be accessed by different software programs. For example, storage device 520 may include a section designated for specific purposes, such as storing program instructions or data for updating software of the computing device 500. In one embodiment, the software to be updated includes the ROM, or firmware, of the computing device. In certain cases, the computing device 500 may include multiple operating systems. For example, the computing device 500 may include a general-purpose operating system which is utilized for normal operations. The computing device 500 may also include another operating system, such as a bootloader, for performing specific tasks, such as upgrading and recovering the general-purpose operating system and allowing access to the computing device 500 at a level generally not available through the general-purpose operating system. Both the general-purpose operating system and another operating system may have access to the section of storage device 520 designated for specific purposes.

The one or more communications interfaces 525 may include a radio communications interface for interfacing with one or more radio communications devices. In certain cases, elements coupled to the processor may be included on hardware shared with the processor. For example, the communications interfaces 525, storage device 520, and memory 510 may be included, along with other elements such as the digital radio, in a single chip or package, such as in a system on a chip (SOC). Computing device 500 may also include input and/or output devices, not shown, examples of which include sensors, cameras, human input devices, such as mouse, keyboard, touchscreen, monitors, display screen, tactile or motion generators, speakers, lights, etc. Processed input, for example from the image sensor, may be output from the computing device 500 via the communications interfaces 525 to one or more other devices.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. Circuits described herein are reconfigurable to include additional or different components to provide functionality at least partially similar to functionality available prior to the component replacement. Modifications are possible in the described examples, and other examples are possible within the scope of the claims.

What is claimed is:

1. A method, comprising:
    receiving a data object representation of a first circuit block;
    receiving one or more assumptions associated with the first circuit block;
    identifying a synchronization scheme coupled to a port of the first circuit block;
    determining that the synchronization scheme is within a threshold flip-flop depth;
    identifying, based on the determination that the synchronization scheme is within the threshold flip-flop depth, a type of the synchronization scheme and a flip-flop depth between the synchronization scheme and the port;
    generating first convergence information for the first circuit block based on the identified type and flip-flop depth of the synchronization scheme; and
    outputting the generated convergence information.

2. The method of claim 1, wherein ports comprise input ports and output ports.

3. The method of claim 2, wherein the one or more assumptions include assumptions for inputs to be received on the input ports and assumptions for outputs on the output ports.

4. The method of claim 3, further comprising:
    receiving second convergence information for a second circuit block; and
    performing a consistency check based on the first convergence information and the second convergence information.

5. The method of claim 4, further comprising:
    receiving connection information indicating connections between the first circuit block and the second circuit block.

6. The method of claim 4, wherein the consistency check comprises verifying the assumptions for outputs of the first circuit block are consistent with assumptions for inputs of the second circuit block.

7. The method of claim 4, wherein the synchronization scheme is associated with an output port of the first circuit block that is coupled to an input port of the second circuit block, wherein the consistency check comprises verifying that the identified type and flip-flop depth of the synchronization scheme is consistent with an assumption associated with the input port of the second circuit block.

8. The method of claim 1, wherein the synchronization scheme comprises a synchronizer.

9. A non-transitory program storage device comprising instructions stored thereon to cause one or more processors to:
- receive a data object representation of a first circuit block;
- receive one or more assumptions associated with the first circuit block;
- identify a synchronization scheme coupled to a port of the first circuit block;
- determine that the synchronization scheme is within a threshold flip-flop depth;
- identify, based on the determination that the synchronization scheme is within the threshold flip-flop depth, a type of the synchronization scheme and a flip-flop depth between the synchronization scheme and the port;
- generate first convergence information for the first circuit block based on the identified type and flip-flop depth of the synchronization scheme; and
- output the generated convergence information.

10. The non-transitory program storage device of claim 9, wherein ports comprise input ports and output ports.

11. The non-transitory program storage device of claim 10, wherein the one or more assumptions include assumptions for inputs to be received on the input ports and assumptions for outputs on the output ports.

12. The non-transitory program storage device of claim 11, wherein the instructions further comprise instructions to cause the one or more processors to:
- receive second convergence information for a second circuit block; and
- perform a consistency check based on the first convergence information and the second convergence information.

13. The non-transitory program storage device of claim 12, wherein the instructions further comprise instructions to cause the one or more processors to receive connection information indicating connections between the first circuit block and the second circuit block.

14. The non-transitory program storage device of claim 12, wherein the consistency check comprises verifying the assumptions for outputs of the first circuit block are consistent with assumptions for inputs of the second circuit block.

15. The non-transitory program storage device of claim 12, wherein the synchronization scheme is associated with an output port of the first circuit block that is coupled to an input port of the second circuit block, wherein the consistency check comprises verifying that the identified type and flip-flop depth of the synchronization scheme is consistent with an assumption associated with the input port of the second circuit block.

16. The non-transitory program storage device of claim 9, wherein the synchronization scheme comprises a synchronizer.

17. A device comprising:
- one or more processors; and
- a non-transitory program storage device comprising instructions stored thereon to cause the one or more processors to:
  - receive a data object representation of a first circuit block;
  - receive one or more assumptions associated with the first circuit block;
  - identify a synchronization scheme coupled to a port of the first circuit block;
  - determine that the synchronization scheme is within a threshold flip-flop depth;
  - identify, based on the determination that the synchronization scheme is within the threshold flip-flop depth, a type of the synchronization scheme and a flip-flop depth between the synchronization scheme and the port;
  - generate first convergence information for the first circuit block based on the identified type and flip-flop depth of the synchronization scheme; and
  - output the generated convergence information.

18. The device of claim 17, wherein ports comprise input ports and output ports.

19. The device of claim 18, wherein the one or more assumptions include assumptions for inputs to be received on the input ports and assumptions for outputs on the output ports.

20. The device of claim 19, wherein the instructions further comprise instructions to cause the one or more processors to:
- receive second convergence information for a second circuit block; and
- perform a consistency check based on the first convergence information and the second convergence information.

* * * * *